US012800333B2

(12) United States Patent
Dobkowitz et al.

(10) Patent No.: US 12,800,333 B2
(45) Date of Patent: Nov. 17, 2026

(54) METHOD FOR DISPLAYING PREPARED ROUTE DATA IN AN ANIMATED MANNER BY MEANS OF A HEAD-UP DISPLAY, COMPUTING DEVICE, COMPUTER-READABLE (STORAGE) MEDIUM, ASSISTANCE SYSTEM FOR A VEHICLE

(71) Applicant: Bayerische Motoren Werke Aktiengesellschaft, Munich (DE)

(72) Inventors: Michael Dobkowitz, Neusaess (DE); Christian Schaaf, Unterschleissheim (DE); Hubert Scholz, Munich (DE); Josef Schumann, Regensburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 39 days.

(21) Appl. No.: 18/851,898

(22) PCT Filed: Mar. 8, 2023

(86) PCT No.: PCT/EP2023/055824
§ 371 (c)(1),
(2) Date: Sep. 27, 2024

(87) PCT Pub. No.: WO2023/198366
PCT Pub. Date: Oct. 19, 2023

(65) Prior Publication Data

US 2025/0216213 A1 Jul. 3, 2025

(30) Foreign Application Priority Data

Apr. 13, 2022 (DE) ..................... 10 2022 109 158.9

(51) Int. Cl.
*G01C 21/36* (2006.01)
*B60K 35/234* (2024.01)
*B60K 35/28* (2024.01)

(52) U.S. Cl.
CPC .......... *G01C 21/365* (2013.01); *B60K 35/234* (2024.01); *B60K 35/28* (2024.01);
(Continued)

(58) Field of Classification Search
CPC .............. G01C 21/365; G01C 21/3632; G01C 21/3638; B60K 35/234; B60K 35/28;
(Continued)

(56) References Cited

U.S. PATENT DOCUMENTS 9,791,288 B2 * 10/2017 Mueller ............. G01C 21/3632
2010/0253541 A1 * 10/2010 Seder ................... G08G 1/0962
(Continued)

FOREIGN PATENT DOCUMENTS

DE 102009027026 A1 * 12/2010 ........... B62D 15/029
DE 10 2010 007 260 A1 8/2011
(Continued)

OTHER PUBLICATIONS

Machine Translation of WO 2019131296 A (Year: 2019).*
(Continued)

*Primary Examiner* — Ellis B. Ramirez
(74) *Attorney, Agent, or Firm* — Crowell & Moring LLP

(57) ABSTRACT

A method is provided for assisting a driver of a vehicle when driving along a predetermined route in road traffic, which includes receiving prepared route data that describe the predetermined route in front of the vehicle at least via bend parameters. The method also includes displaying the prepared route data in an animated manner, wherein the animated display is effected in augmented reality using a head-up display. During the animated display of the pre-
(Continued)

pared route data, a bend in the predetermined route in front of the vehicle that is visible to the driver is announced in this case by a docked display element and an announcing display element above a road. The bend in front of the vehicle that is visible to the driver is announced by virtue of the announcing display element moving along the bend in augmented reality.

13 Claims, 2 Drawing Sheets

(52) U.S. Cl.
CPC ..... *G01C 21/3632* (2013.01); *G01C 21/3638* (2013.01); *B60K 2360/166* (2024.01); *B60K 2360/167* (2024.01); *B60K 2360/177* (2024.01); *B60K 2360/1868* (2024.01); *B60K 2360/188* (2024.01)

(58) Field of Classification Search
CPC ........ B60K 2360/166; B60K 2360/167; B60K 2360/177; B60K 2360/1868; B60K 2360/188
USPC .................... 701/436, 532; 345/7, 959, 619; 340/995.12, 995.14, 988; 359/630
See application file for complete search history.

(56) References Cited

U.S. PATENT DOCUMENTS

| | | | |
|---|---|---|---|
| 2013/0006531 | A1 | 1/2013 | Gee et al. |
| 2014/0371988 | A1 | 12/2014 | Muramatsu et al. |
| 2016/0003636 | A1 | 1/2016 | Ng-Thow-Hing et al. |
| 2020/0064629 | A1* | 2/2020 | Yamashita ............ G06F 3/1446 |
| 2020/0184812 | A1* | 6/2020 | Han ........................ G06V 20/20 |
| 2020/0339138 | A1 | 10/2020 | Ko |
| 2021/0039715 | A1 | 2/2021 | Ferrer et al. |
| 2022/0084458 | A1* | 3/2022 | Sakuma ............... G09G 3/2096 |
| 2023/0314157 | A1* | 10/2023 | Weiss ...................... G06V 20/20 |
| 2024/0053163 | A1* | 2/2024 | Shtok ................... G01C 21/365 |

FOREIGN PATENT DOCUMENTS

| | | | | | |
|---|---|---|---|---|---|
| DE | 10 2013 010 818 | A1 | | 12/2013 | |
| DE | 10 2013 016 251 | A1 | | 6/2014 | |
| DE | 10 2014 108 045 | A1 | | 12/2014 | |
| DE | 11 2018 007 027 | T5 | | 11/2020 | |
| DE | 102020200047 | A1 | * | 7/2021 | ........... G01C 21/365 |
| JP | 2006284458 | A | * | 10/2006 | ............. B60K 35/29 |
| KR | 20120031656 | A | * | 4/2012 | ............. G08G 1/052 |
| WO | WO-2019131296 | A1 | * | 7/2019 | ............. G02B 27/01 |

OTHER PUBLICATIONS

International Search Report (PCT/ISA/210) issued in PCT Application No. PCT/EP2023/055824 dated Jun. 27, 2023 with English translation (4 pages).
German-language Written Opinion (PCT/ISA/237) issued in PCT Application No. PCT/EP2023/055824 dated Jun. 27, 2023 with English translation (8 pages).
German-language Search Report issued in German Application No. 10 2022 109 158.9 dated Jan. 11, 2023 with partial English translation (13 pages).

* cited by examiner

METHOD FOR DISPLAYING PREPARED ROUTE DATA IN AN ANIMATED MANNER BY MEANS OF A HEAD-UP DISPLAY, COMPUTING DEVICE, COMPUTER-READABLE (STORAGE) MEDIUM, ASSISTANCE SYSTEM FOR A VEHICLE

BACKGROUND AND SUMMARY

The present invention relates to a method for displaying prepared route data in an animated manner by means of a head-up display. In addition, the present invention relates to a computing device for a vehicle for carrying out such a method. Finally, the present invention relates to a computer-readable (storage) medium and to an assistance system for a vehicle.

Driver assistance systems such as cruise control systems or lane departure warning systems are taking over more and more tasks from the driver of a vehicle. In addition, navigation systems are also increasingly being used as a standard feature in vehicles. The interaction of navigation system and driver assistance systems offers more and more new possibilities in this case. Thus, for example, additional items of information about the route course lying before the driver can be made available to the driver.

The increasing use of so-called head-up displays creates additional possibilities, particularly because these are being developed more and more in the direction of augmented reality. An interaction of the three above-mentioned systems, thus an interaction of navigation systems, driver assistance systems and so-called augmented reality head-up displays (AR-HUD) raises questions as to how further items of information on the surroundings of the vehicle and the route course can be intuitively displayed to the driver of a vehicle. The concept of the eHorizon is also found in this context in the literature.

Document DE 10 2010 007 260 A1 relates to a method for optimizing the provision of a predictive eHorizon in a driver assistance system. A method for providing a predictive eHorizon in a driver assistance system is specified, wherein a horizon provider in a driver assistance system provides items of information about a route course to be expected to an assistant system application. The horizon provider creates a foresight table, which contains items of information about the route course to be expected and/or data to be provided depending on the route course, which are assigned in the foresight table to a position of the vehicle to be expected. The data of the foresight table to be provided to the assistance system application are at least partially taken from the foresight table depending on the current position of the vehicle.

It is an object of the present invention to disclose a solution for how a driver of a vehicle can be informed or made aware—beyond the prior art—in an improved manner about the route course lying before the driver.

The object is achieved according to the invention by a method, by a computing device, by a computer-readable (storage) medium, and by an assistance system for a vehicle having the features according to the independent claims. Advantageous refinements of the present invention are specified in the dependent claims.

A method according to the invention for assisting a driver of a vehicle while driving on a predetermined route course in road traffic comprises receiving prepared route data, which describe the predetermined route course lying before the vehicle at least by means of curve parameters. In addition, the method according to the invention comprises an animated display of the prepared route data, wherein the animated display takes place within an augmented reality by means of a head-up display. In the animated display of the prepared route data, a curve of the predetermined route course, which is visible to the driver and is located in front of the vehicle, is announced in this case by a docked display element and an announcing display element above a roadway. The curve which is visible to the driver and is located in front of the vehicle is announced here in that the announcing display element moves along the curve within the augmented reality.

In other words, the driver of the vehicle can be prepared for the predetermined route course by means of the method according to the invention. The predetermined route course can be predetermined, for example, on the basis of a destination input in a navigation system, on the basis of the road course, on the basis of a circuit, on the basis of a travel path considered to be most probable, or the like. In particular, the driver can be made intuitively aware of an upcoming curve in this case.

Prepared route data can be received for this purpose. The prepared route data can be provided, for example, by a navigation system or the like. However, it is also conceivable that the prepared route data are determined on the basis of map data and the predetermined route course. The predetermined route course can be described here by means of the curve parameters. The predetermined route course can thus be described, for example, by curve courses, curve radii, or the like and by corresponding lengths of the individual sections.

The driver can then be informed in an animated manner about the predetermined route course by means of the docked display element and by means of the announcing display element. An augmented reality can be generated for the driver here by means of the head-up display, which in the ideal case is designed as a so-called augmented reality head-up display (AR-HUD). An intuitive understanding of the predetermined route course can thus be conveyed. Within the augmented reality, the docked display element and the announcing display element can be displayed above the roadway in order to convey an improved visual impression for a location of the vehicle on the roadway.

The docked display element can always be located, for example, at the same position in the field of view of the driver, so that the impression of a leading or floating object is conveyed, which points the way to the driver of the vehicle. The docked display element, and also the announcing display element, can be designed, for example, as an arrow element, as an avatar, or the like. The announcing display element does not necessarily have to be visible to the driver at all times. For example, it is conceivable that the announcing display element is initially concealed by the visible docked display element.

As soon as a curve located in front of the vehicle comes closer or enters the field of view of the driver, thus, for example, when a predetermined distance or duration to the curve is fallen below, the announcing display element can be inserted or can appear in an animated manner. The announcing display element can also detach itself from the docked display element. The curve, which is visible to the driver and is located in front of the vehicle, can be announced here in that the announcing display element moves along the curve within the augmented reality and thus points the way to the driver. The driver can in particular also be made intuitively aware here of occurring lateral accelerations, critical bottlenecks, hairpin curves, or the like.

It is advantageous if in addition driving dynamics data are received, which describe a vehicle speed and/or a vehicle lateral acceleration of the vehicle. In the animated display, the docked display element can thus be displayed inclined corresponding to an angle of inclination within the augmented reality relative to the roadway, wherein the angle of inclination of the docked display element depends on the vehicle speed and/or the vehicle lateral acceleration and/or the curve parameters.

On the basis of the additional driving dynamics data, which can be provided, for example, by a central control unit of the vehicle, corresponding sensors, or the like, an angle of inclination for the docked display element can thus be determined. The angle of inclination can describe, for example, current lateral accelerations, centrifugal forces, or the like. An interactive relationship between driver and driving experience can be established by the inclination of the docked display element. Moreover, the driver can thus be put in a so-called flow, so that the driving safety can be increased on the basis of psychological aspects. The driver can be put here into a mental state of increased concentration. Overall, the pleasure in driving can thus be increased.

Alternatively or additionally, a predicted lateral acceleration profile can be determined on the basis of the vehicle speed and/or the vehicle lateral acceleration and/or the curve parameters, wherein the predicted lateral acceleration profile describes a profile of the lateral acceleration of the vehicle to be expected when driving on the curve located in front of the vehicle. It is thus possible that in the animated display, the announcing display element, which moves within the augmented reality along the curve, inclines during the movement depending on the predicted lateral acceleration profile.

In other words, by means of an inclination of the announcing display element, while the announcing display element moves within the augmented reality along the curve, a feeling for lateral accelerations likely to be encountered can be conveyed to the driver. An inclination of the announcing display element can be compared, for example, to a curve location of a motorcycle rider riding in front or a flight maneuver of a miniature aircraft flying in front. An improved feeling for the current vehicle speed can thus be conveyed to the driver of the vehicle. In particular, it can thus be made clear to the driver which centrifugal forces can occur due to a lateral acceleration in the curve. A synergistic effect can be achieved by the inclination of the announcing display element together with the inclination of the docked display element, which can in particular increase the driving safety and can enable a fluid driving experience.

In addition, it can be advantageous if, in the animated display of the prepared route data, the driver is notified by means of a pointing display element, which is located at a curve position assigned to the curve within the augmented reality of the head-up display, about the curve which is visible to the driver and is located in front of the vehicle. A pointing display element can be based, for example, on a curve sign, which notifies road users of strong and/or tight curves. The attentiveness of the driver can thus be additionally amplified, so that the safety can in turn be increased.

It can be provided here that the pointing display element is displayed at the curve position assigned to the curve within the augmented reality of the head-up display by means of chevrons, wherein a chevron density assigned to the chevrons describes a curve radius of the curve of the predetermined route course located in front of the vehicle. In particular, the display by means of chevrons (from the French for angle, rafter, zigzag strip), i.e., single arrow elements arranged one behind another, can be intuitively comprehensible. This is especially true because such elements are presumably known to the road user and thus the driver of the vehicle already from curve signs. In addition, a curve curvature and/or a curve radius can be described via the number of the chevrons and/or via their density and/or via the spacing of the chevrons, wherein such a description can in turn be intuitively comprehensible.

Furthermore, it is possible that a recommended action is determined on the basis of the driving dynamics data and/or the prepared route data. The pointing display element, which is located in a curve position assigned to the curve within the augmented reality of the head-up display, can thus be colored depending on the recommended action. In other words, it can thus be advantageous if the driver is additionally warned, for example, in particularly critical situations. However, it can also be advantageous if the driver is informed that the vehicle, for example, is already moving at optimum driving speed. The pointing display element can therefore be colored green, for example. However, if the vehicle approaches the curve, toward which the pointing display element already points, at elevated driving speed, the pointing display element can thus be colored orange or red, for example. The safety can thus be additionally increased and the driving experience can be improved.

Finally, it can also be provided that the prepared route data comprise a trajectory prediction, which comprise at least one roadway edge and/or one roadway marking of the predetermined route course. The roadway edge and/or the roadway marking can thus be displayed within the augmented reality of the head-up display, wherein the displayed roadway edge and/or the displayed roadway marking can extend beyond an actual field of view of the driver upon concealment by a surroundings object.

Additionally or alternatively, it can thus also be advantageous if the roadway edge and/or the roadway marking are highlighted within the augmented reality. This can also be advantageous in particular if a curve of the predetermined route course located in front of the vehicle is not visible to the driver of the vehicle due to a concealment. This can be the case, for example, due to vegetation (trees, agricultural/corn fields or the like) and other road users (trucks or the like). In such cases, it can therefore be advantageous if the driver can be made aware of the predetermined route course. If the prepared route data additionally comprise a trajectory prediction, this can be displayed to the driver of the vehicle within the augmented reality. The driver can thus be prepared for the predetermined route course located in front of the driver, even if it cannot be seen fully due to geometric concealments.

It can also be advantageous if the displayed roadway edge and/or the displayed roadway marking are colored depending on the recommended action, wherein in particular a curve following the curve located in front of the vehicle is taken into consideration in the determination of the recommended action. In order to already give the driver feedback early with respect to the interaction of predetermined route course and driving dynamics data, in particular in critical situations, it can be advantageous if the displayed roadway edge and/or the displayed roadway marking is colored depending on the recommended action—as already described in the case of the pointing display element.

A further aspect of the invention relates to a computing device for a vehicle, which is configured to execute a method according to the invention and the advantageous embodiments thereof. The invention furthermore relates to a computer-readable (storage) medium, comprising commands which, upon the execution by a computing device, prompt it to carry out a method according to the invention and the advantageous embodiments thereof. Furthermore, the present invention relates to a computer program, comprising commands which, upon the execution of the program by a computing device, prompt it to carry out a method according to the invention and the advantageous embodiments thereof.

The present invention moreover relates to an assistance system for a vehicle, comprising a computing device according to the invention for a vehicle, a computer-readable (storage) medium according to the invention, and a display device, which is configured to display prepared route data in an animated manner within an augmented reality of a head-up display. Finally, the present invention also relates to a vehicle comprising an assistance system according to the invention. The vehicle can be designed in particular as a passenger vehicle.

The preferred embodiments presented with respect to the method according to the invention and the advantages thereof apply accordingly to the computing device according to the invention, to the computer-readable (storage) medium according to the invention, to the computer program according to the invention, to the assistance system according to the invention, and to the vehicle according to the invention.

Further features of the invention result from the claims, the FIGURES, and the description of the FIGURES. The features and combinations of features mentioned above in the description, and the features and combinations of features mentioned hereinafter in the description of the FIGURES and/or solely shown in the FIGURES are usable not only in the respectively specified combination, but also in other combinations or on their own, without departing from the scope of the invention.

The invention will now be explained in more detail on the basis of preferred exemplary embodiments and with reference to the appended drawings. In the FIGURES:

DETAILED DESCRIPTION OF THE DRAWINGS

In the FIGURES, identical or functionally identical elements are provided with the same reference signs.

Figure 1:
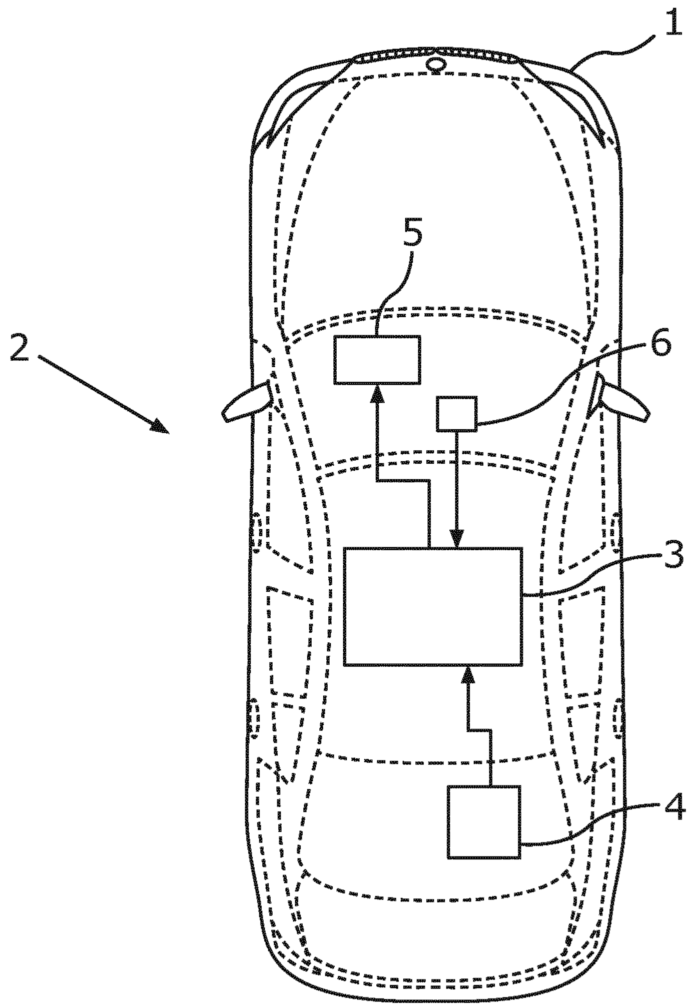
FIG. 1 shows a schematic representation of a vehicle, comprising an assistance system according to the invention and a navigation system.

FIG. 1 shows a schematic representation of a vehicle 1. The vehicle 1 comprises an assistance system 2. The assistance system 2 comprises here a computing device 3, a computer-readable (storage) medium 4, and a display device 5. Furthermore, the vehicle 1 comprises a navigation system 6.

The computing device 3 of the assistance system 2 can be configured to carry out a method for assisting a driver of the vehicle 1 when driving on a predetermined route course in road traffic. The navigation system 6 can provide prepared route data to the computing device 3 of the assistance system 2. The prepared route data can be displayed in an animated manner by means of the display device 5 of the assistance system 2. The display device 5 can be designed here as a so-called augmented reality head-up display (AR-HUD). Such a head-up display enables the prepared route data to be displayed in an animated manner within an augmented reality.

A curve 13 of the predetermined route course located in front of the vehicle 1 can thus be announced by means of the display device 5. The announcement of the curve 13 located in front of the vehicle 1 can be announced here by means of a docked display element 7 and an announcing display element 8. The docked display element 7 and the announcing display element 8 can be projected onto a windshield of the vehicle 1, so that the docked display element 7 and the announcing display element 8 are displayed above the roadway 9 for the driver of the vehicle 1. The impression thus arises for the driver of the vehicle 1 that the docked display element 7 and the announcing display element 8 are part of the surroundings 10 of the vehicle 1.

Such an animated display of prepared route data within an augmented reality by means of a head-up display enables a fluid and safe way of driving. Moreover, the driver of the vehicle 1 does not have to look away from the roadway 9 and look toward a display in the interior of the vehicle 1 in order to obtain items of information on the route course located in front of the driver. Furthermore, the driver feels safer. The impression can thus be conveyed to the driver of the vehicle 1 as if the driver already knew the route course located in front of the driver and in particular the curve 13 located in front of the vehicle 1.

FIGS. 2*a*-2*d* show individual snapshots of the animated display of the prepared route data. The prepared route data describe a curve 13 of the predetermined route course located in front of the vehicle 1. FIGS. 2*a*-2*d* show here a time sequence when driving on the curve 13 located in front of the vehicle 1 in a corresponding order. FIGS. 2*a*-2*d* moreover show the view of the driver of the vehicle 1 through the windshield of the vehicle 1. The view through the windshield of the vehicle 1 is here an augmented reality, which can be implemented by means of the display device 5 in the form of an augmented reality head-up display (AR-HUD).

The docked display element 7 can be permanently visible to the driver of the vehicle 1. The docked display element 7 is located here in FIGS. 2*a*-2*d* above the roadway 9.

The docked display element 7 can thus float above the roadway 9 and can always be located at the same point with respect to the field of view of the driver of the vehicle 1. The driver of the vehicle 1 can thus be made aware of the predetermined route course. By means of additional driving dynamics data, which can be provided, for example, by a central control unit of the vehicle 1, corresponding sensors, or the like, an angle of inclination a can be determined for the docked display element 7. In the animated display, the docked display element 7 can be inclined relative to the roadway 9 corresponding to the angle of inclination a. Occurring lateral accelerations can thus be visually conveyed to the driver of the vehicle 1 by means of the docked display element 7. The angle of inclination a can change here while driving on the curve 13. This is shown by a greater angle of inclination a in FIG. 2*d* in relation to FIG. 2*a*.

Figure 2A:
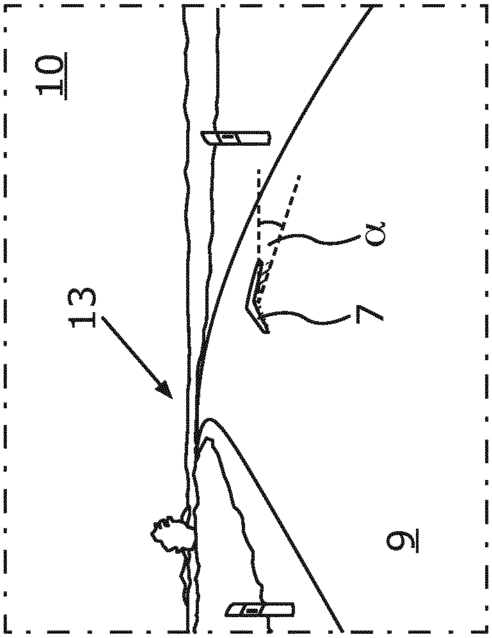
FIGS. 2*a*-2*d* show a schematic representation of individual snapshots of the animated representation of prepared route data while driving on a curve located in front of the vehicle.
Figure 2B:
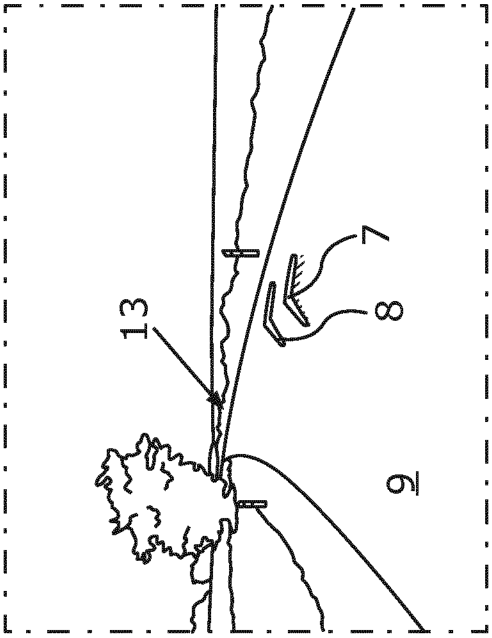
Figure 2C:
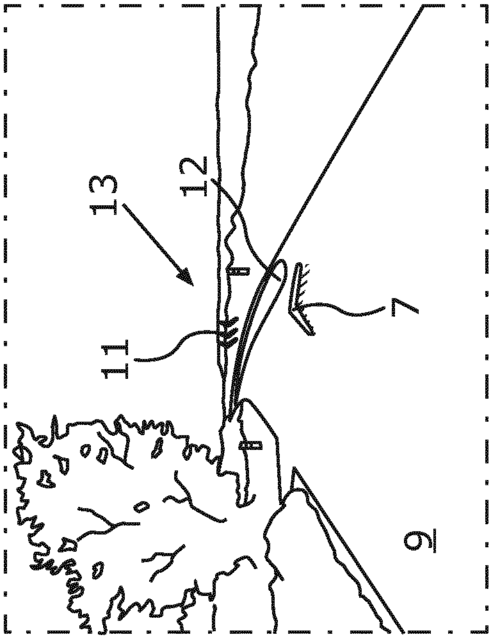
Figure 2D:
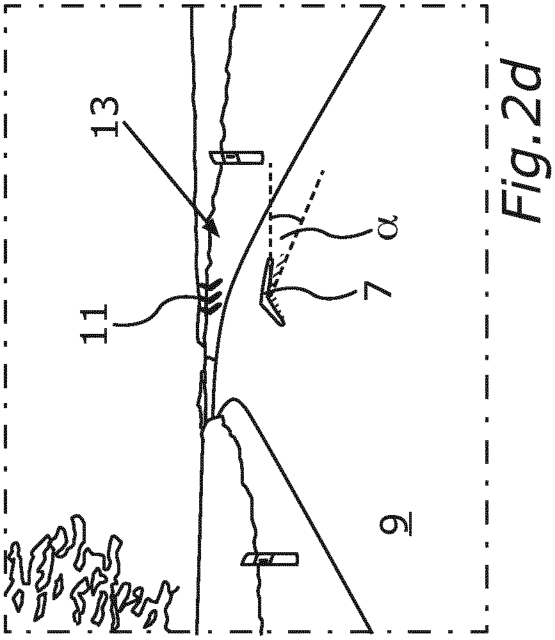

If the vehicle 1 approaches a curve 13 of the predetermined route course located in front of the vehicle, the curve 13 located in front of the vehicle 1 can thus be announced in an animated manner by the announcing display element 8. The docked display element 7 and the announcing display element 8 can initially be displayed superimposed (cf. FIG. 2*a*). If a predetermined distance, a predetermined duration, or the like to the curve 13 located in front of the vehicle 1 is fallen below, the announcing display element 8 can detach from the docked display element 7 and move along the curve 13 located in front of the vehicle 1. In other words, the announcing display element 8 flies within the augmented reality of the head-up display, which can be generated by the display device 5, through the curve 13 located in front of the vehicle 1. The driver of the vehicle 1 can be notified of the curve 13 located in front of the driver by the animated display by means of the announcing display element 8. In addition, the predetermined route course can be indicated to the driver of the vehicle 1. The movement of the announcing display element 8 within the augmented reality along the curve 13 can be additionally amplified by a stylized tail 12. This is shown in FIG. 2*c*.

A predicted lateral acceleration profile can be determined by means of the additional driving dynamics data and/or the curve parameters of the curve 13 located in front of the vehicle 1. The predicted lateral acceleration profile can describe a profile of the lateral acceleration of the vehicle 1 to be expected when driving on the curve 13 located in front of the vehicle 1. In the animated display, the announcing display element 8, which moves within the augmented reality along the curve 13, can be inclined in relation to the roadway 9 during the movement depending on the predicted lateral acceleration profile. The driver can thus be notified of centrifugal forces, which are expected to act on the driver when driving on the curve 13, or the like. A (safety) feeling for the curve 13 which is located in front of the vehicle 1 and is to be driven on in the future can thus be conveyed to the driver of the vehicle 1 already at an early point in time. The driver of the vehicle 1 can decide depending on this, for example, to reduce the speed of the vehicle 1 accordingly.

The curve 13 located in front of the vehicle 1 can additionally be pointed out by means of a pointing display element 11, which is located at a curve position assigned to the curve 13 within the augmented reality of the head-up display. The pointing display element 11 can be displayed by means of chevrons (from the French for angle, rafter, or zigzag strip) or other (arrow) elements.

The display by means of chevrons is intuitively comprehensible to the driver of the vehicle 1 and is already known from corresponding direction signs for curves. A chevron density of the pointing display element 11 assigned to the chevrons can describe a curve radius of the curve 13 of the predetermined route course located in front of the vehicle.

It is also conceivable that the pointing display element 11 moves along within the curve 13 in the context of the augmented reality. In particular, it is thus possible that in elongated curves having possibly variable curve radius, the driver is always made aware of a current curvature course. Moreover, the driver of the vehicle 1 can thus always assess the curve 13 correctly. The safety and in particular the feeling of safety of the driver of the vehicle 1 can thus be increased.

The invention claimed is:

1. A method for assisting a driver of a vehicle when driving on a predetermined route course in road traffic, the method comprising:

receiving prepared route data, which describe the predetermined route course located in front of the vehicle at least via curve parameters; and displaying the prepared route data in an animated display, wherein the animated display takes place within an augmented reality via a head-up display, wherein in the animated display of the prepared route data, a curve of the predetermined route course, which is visible to the driver and is located in front of the vehicle, is announced by a docked display element and an announcing display element above a roadway;

wherein the curve, which is visible to the driver and is located in front of the vehicle, is announced by the announcing display element moving within the augmented reality along the curve;

wherein driving dynamics data are additionally received, which describe a vehicle speed and a vehicle lateral acceleration;

in the animated display, the docked display element is displayed within the augmented reality inclined relative to the roadway at an angle of inclination, wherein the angle of inclination of the docked display element depends on the vehicle speed and/or the vehicle lateral acceleration and/or the curve parameters; and wherein the docked display element and the announcing display element are distinct display elements, the docked display element being maintained at a fixed position in the field of view of the driver while the announcing display element detaches from the docked display element and moves along the curve within the augmented reality.

2. The method according to claim 1, wherein a predicted lateral acceleration profile is determined based on the vehicle speed and/or the vehicle lateral acceleration and/or the curve parameters, wherein the predicted lateral acceleration profile describes a profile of the lateral acceleration of the vehicle to be expected when driving on the curve located in front of the vehicle; and in the animated display, the announcing display element, which moves within the augmented reality along the curve, inclines during the movement depending on the predicted lateral acceleration profile.

3. The method according to claim 2, wherein in the animated display of the prepared route data, the driver is made aware of the curve, which is visible to the driver and is located in front of the vehicle, by a pointing display element, which is located at a curve position assigned to the curve within the augmented reality of the head-up display.

4. The method according to claim 2, wherein the prepared route data comprise a trajectory prediction, which comprises at least one roadway edge and/or one roadway marking of the predetermined route course; and the roadway edge and/or the roadway marking are displayed within the augmented reality of the head-up display, wherein the displayed roadway edge and/or the displayed roadway marking extend beyond an actual field of view of the driver upon concealment by a surroundings object.

5. The method according to claim 1, wherein in the animated display of the prepared route data, the driver is made aware of the curve, which is visible to the driver and is located in front of the vehicle, by a pointing display element, which is located at a curve position assigned to the curve within the augmented reality of the head-up display.

6. The method according to claim 5, wherein the pointing display element is displayed at the curve position assigned to the curve within the augmented reality of the head-up display using chevrons, wherein a chevron density assigned to the chevrons describes a curve radius of the curve of the predetermined route course located in front of the vehicle.

7. The method according to claim 5, wherein a recommended action is determined based on the driving dynamics data and/or the prepared route data; and the pointing display element, which is located at a curve position assigned to the curve within the augmented reality of the head-up display, is colored depending on the recommended action.

8. The method according to claim 7, wherein the displayed roadway edge and/or the displayed roadway marking are colored depending on the recommended action, wherein a curve following the curve located in front of the vehicle is taken into consideration when determining the recommended action.

9. The method according to claim 1, wherein the prepared route data comprise a trajectory prediction, which comprises at least one roadway edge and/or one roadway marking of the predetermined route course; and the roadway edge and/or the roadway marking are displayed within the augmented reality of the head-up display, wherein the displayed roadway edge and/or the displayed roadway marking extend beyond an actual field of view of the driver upon concealment by a surroundings object.

10. The method according to claim 9, wherein the displayed roadway edge and/or the displayed roadway marking are colored depending on the recommended action, wherein a curve following the curve located in front of the vehicle is taken into consideration when determining the recommended action.

11. A computing device for a vehicle, which is configured to carry out a method according to claim 1.

12. A non-transitory computer-readable medium storing commands which, upon execution by a computing device, cause the computing device to carry out a method according to claim 1.

13. An assistance system for a vehicle, the assistance system comprising:

a computing device for the vehicle;

a non-transitory computer-readable medium storing commands which, upon execution by the computing device, cause the computing device to carry out a method according to claim 1;

a display device, which is configured to display prepared route data within an augmented reality of a head-up display in an animated manner.

* * * * *